April 29, 1952
H. ANDRÉ
2,594,709
SILVER AND ZINC ACCUMULATOR WITH INSOLUBLE NEGATIVE
ELECTRODE AND INVARIABLE ELECTROLYTE
Filed April 1, 1947
2 SHEETS—SHEET 1
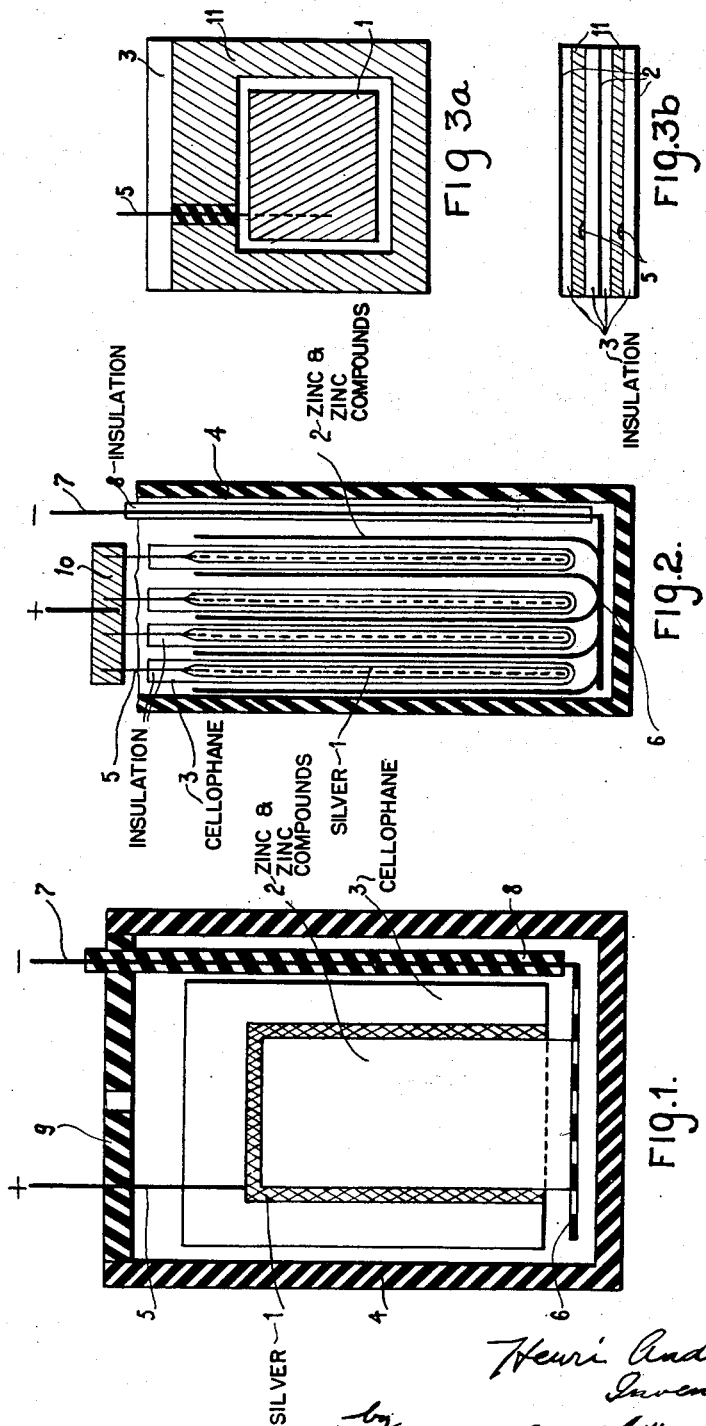

April 29, 1952             H. ANDRÉ               2,594,709
SILVER AND ZINC ACCUMULATOR WITH INSOLUBLE NEGATIVE
ELECTRODE AND INVARIABLE ELECTROLYTE
Filed April 1, 1947                             2 SHEETS—SHEET 2
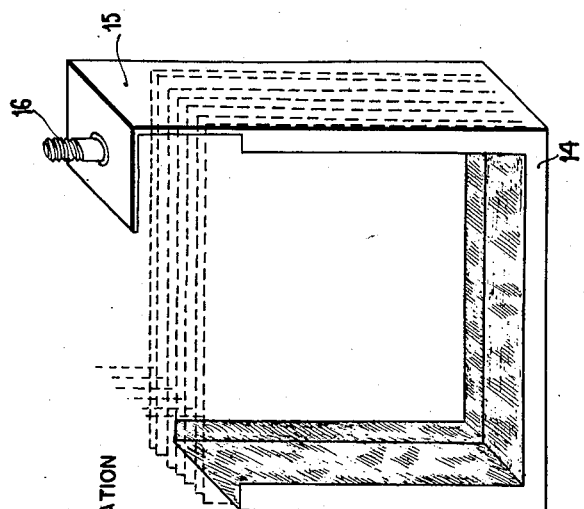
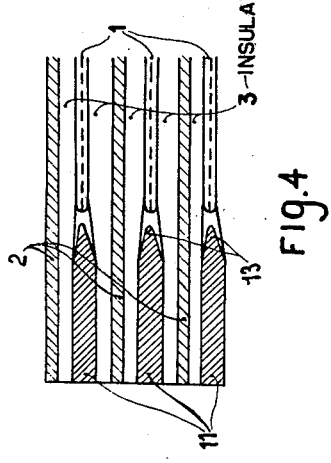
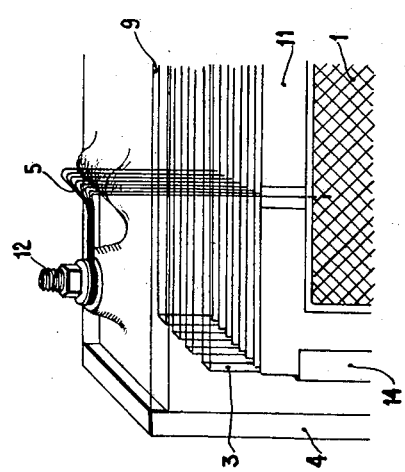
Henri André
Inventor Patented Apr. 29, 1952

2,594,709

UNITED STATES PATENT OFFICE 2,594,709

SILVER AND ZINC ACCUMULATOR WITH INSOLUBLE NEGATIVE ELECTRODE AND INVARIABLE ELECTROLYTE

Henri André, Montmorency, France, assignor to Yardney International Corp., New York, N. Y., a corporation of New York Application April 1, 1947, Serial No. 738,702
In France April 11, 1946

5 Claims. (Cl. 136—30)

This invention relates to electric storage batteries or accumulators comprising a set of electrodes in an alkaline electrolyte including a negative electrode containing zinc and a positive electrode containing a metal more electropositive than zinc (preferably silver), the electrodes of opposite polarity being separated from one another by an insulating spacer or spacers which are permeable to the electrolyte but substantially prevent the migration of particles from one electrode to the other.

The general object of this invention is to provide means for increasing the number of charging and discharging cycles obtainable with a battery of this description by preventing early deterioration of the separator material due to gradual widening of the interstices or pores thereof.

In my earlier U. S. Patent No. 2,317,711, granted April 27, 1943, I have disclosed a battery of this general description in which use is made of an unsaturated alkaline electrolyte, the zinc electrode being thus soluble in said electrolyte. The present invention is directed to a battery in which the electrolyte will not appreciably attack the zinc, by virtue of the fact that the electrolyte is substantially saturated with zinc, in a manner well known per se, with a maximum saturation adjacent the negative electrode.

Experiments have shown that under its most perfected form at the present moment, the silver oxide accumulator with soluble zinc in an alkaline medium, although attaining and surpassing 40 watt-hours per kilogram of element, does not furnish more than about a hundred normal cycles and degenerates progressively. It even gives rise to premature breakdowns which are manifested by a quasi-total loss of its capacity.

This lack of endurance is due in particular to the migration of the zinc which at the end of the charge tends to rejoin the silver, thus putting the element in partial or total short-circuit.

The mere and simple utilization of diaphragms, whatever may be their porous or permeable texture and the care paid to their method of surrounding the silver positive electrodes, does not permit of a sufficient protection against the deposits of zinc which finally bridge or perforate them.

Thousands of tests have clearly shown that these heterogeneous deposits are preferably produced in the zones where the electrolyte is free to the greatest extent and they metalize all the more the diaphragms the more these are dilated or insufficiently homogeneous. They affect more particularly the devices in which too dense a current is applied.

This is the case in particular with the silver and soluble zinc accumulator, the characteristic reactions of which may be expressed as follows:

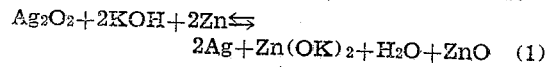

From the Reactions 1 and 2 it will be deduced that the electrolyte, initially with a basis of potash KOH, dissolves the zinc by anodic oxidation forming a salt, zincate of potash $Zn(OK)_2$, and that at the end of the discharge the residual zinc is oxidized owing to the displacement of the oxygen of the silver oxide $Ag_2O$ to form zinc oxide ZnO.

The characteristic reactions of the accumulator, according to the invention are:

In Reaction 1 there is given the transformation of the potash KOH into zincate of potash $Zn(OK)_2$ with the formation of water; in Reaction 2 it is seen that the zinc is in part converted into a hydroxide in the form of $Zn(OH)_2$ and is in part oxidized into ZnO during the discharge, to be reduced electrolytically and pass again during the charge to the state of spongy zinc Zn.

In accordance with the invention the interelectrode spacers or separators are constituted by diaphragms of substantially homogeneous, organic sheet material which are compressed between the electrodes in such manner as to arrest all circulation of free electrolyte around them and avoid abnormal swelling of the diaphragms, and in this way to suppress all metallic precipitation in these permeable separators.

The initial saturation of the electrolyte with zinc may be carried out before the filling up of the accumulator, but it can naturally take place at the first discharge which involves use of a quantity of zinc considerably greater than its electrochemical equivalent.

After two or three cycles, the electrolyte remains saturated even at the end of the charge and this all the more so as the diaphragms are compressed.

To this end, the group of electrodes assembled with the separating diaphragms are placed in the container before introduction of the electrolyte. In this phase of the assemblage the active block is less thick, since the diaphragms are not yet expanded, and it enters freely into the container or into the casing reserved for it, as will be referred to below. It could not penetrate into the latter after impregnation, for there is provided for its expansion a space only permitting a swelling of the separators in the ratio of about 1 to 3, whereas these normally tend to expand in the ratio of 1 to 3.5.

There results from this practice a somewhat pronounced compression which tests have endorsed as suitable. Actually, if the diaphragms owing to insufficient compression can expand more, the result is the appearance of short-circuits by metalization; if, on the contrary, this compression is excessive the slowing down of the diffusion makes the accumulator extremely sluggish.

The connection of the electrodes in spongy zinc takes place at the base of the active block by means of a metallic leaf or sheet insoluble in the potash, arranged horizontally and forming a support for the plates of zinc resting thereon. A sufficiently homogenous connection is assured by a quantity of zinc in powder form which can be precipitated in this region where some free liquid is present.

The metallic sheet is connected to one or more insulated wires which run up to the negative terminal between the block of electrodes and the container. In a modified assemblage the connection is assured by a metallic strap which mechanically supports the active block and which is connected to the negative terminal.

On the positive side each electrode, constituted by a metallic sheet pasted with silver, carries a wire. The wires are either connected to a collector in the interior of the container, or pass through the cover thereof. In the latter case, a tight joint around the passage of each wire is ensured by fusion of the plastic material used for making the cover and the container. In this way, the chances of escape of electrolyte are reduced to a minimum owing to the small section of the traversing wires. The positive terminal can furthermore be embedded in the external part of the cover.

To avoid accidental deposits of zinc in the upper part and on the sides of the elements, where a certain quantity of free electrolyte can circulate, it is arranged according to the invention to allow the separators to project beyond the vertical and upper edges of the electrodes, the base of the positive electrodes being hidden by the fold of the diaphragms, arranged in V-form around each one of them. In swelling, the separator diaphragms meet and entirely confine the electrodes.

The confinement of the positives is, however, made more absolute by arranging round them insulating frames, of the same thickness, the upper edge of which is provided with a vertical channel intended for the outlet of the connection wire and for the evacuation of the gases in excess.

The elementary entity comprising the electrodes and the diaphragms having acquired their ultimate thickness has a thickness comprised between 1.5 and 2 millimeters. This dimension given by way of example illustrates more precisely the flat character of the accumulator obtained in accordance with the present invention.

A battery according to the present invention may have the following features:

1. Ratio of energy to mass and volume is double that of the silver and soluble zinc accumulator and thrice that of the lead or nickel accumulator.

2. Mechanical robustness due to the clamping of the electrodes.

3. Almost total immobilization of the electrolyte and small maintenance addition thereof, which can be annulled in the absence of overloads.

4. Toleration of current reversal in the case of prolonged discharge.

5. Output in quantity of the order of 0.9 and in energy (at the terminals) of 0.7.

By way of non-restrictive example, the annexed figures show the practical embodiment of an element of a silver and insoluble zinc accumulator according to the present invention.

In the drawings:

Figure 1 is a view showing the interior of the accumulator, before the electrolyte has been introduced.

Figure 2 is a cross sectional view of Figure 1.

Figure 3a is a top view of a different embodiment of the invention.

Figure 3b is a section on the line III—III of Figure 3a.

Figure 4 is a section on the line IV—IV of Figure 3a.

Figure 5 is a view showing some of the terminal connections on the outside of the receptacle, and Figure 6 is a view of another embodiment of the invention.

Figure 1 shows in elevation the arrangement of the electrodes. Side by side will be seen at 1 the silver positive provided with a connection 5 which may be a wire or a metallic band not subject to attack by the electrolyte. If the surface of the electrode is considerable, since its thickness cannot be increased, there may be provided several bands or wires for connection in parallel. There is shown at 2 the negative of spongy zinc, hardened towards the bottom and passing into the state of hydroxide, $Zn(OH)_2$, during discharge, connected by contact on its folded strip at the bottom to a metallic band or fabric 6 connected in turn to the external circuit by a wire 7 covered with an insulator 8 impermeable to and not attacked by the potash. This insulating tube is sealed in the cover 9.

One of the separator diaphragms is shown at 3 and consists of cellophane, for example, projecting considerably beyond the upper and lateral edges of the electrodes. Towards the bottom there is shown in broken lines the folding of the separating sheet of cellophane 3.

Figure 2 which is a view in cross-section of the element emphasizes the swelling of the diaphragms 3, cellulosic or other, which meet in thickness around the zinc electrodes 2 (in full lines) and of silver 1 (in broken lines) yet are less compressed in the region bordering or extending beyond the electrodes than between the latter, which allows the escape of excess gases.

There is shown in this figure a collector member comprising a metallic plate 10 or metallic fabric onto which there are soldered the wires of each positive and from whence there starts either a single wire or a terminal which passes through the cover. This figure also shows clearly the method of joining the zinc electrodes together by means of a fold made at their base which permits of overlapping one sheet on the following one. The sheet of metal fabric 6 of the preceding figure is again found here and there will be clearly seen the points of contact of each folded negative, reinforced by zinc reduced to powder form. There will also be seen again the connecting wire 7 under the insulating tube 8 between the wall of the receptacle 4 and the active block.

Figs. 3a and 3b represent in elevation and in section, respectively, an embodiment intended to increase the compression of the diaphragms on the periphery of the electrodes, by reason of the presence of frames 11 of plastic material which, having necessarily to allow the passage of the gases disengaged around the positives which they envelop, have at the upper part a channel through which passes the positive connection wire 5.

To prevent the internal edges of these frames 11 from cutting the diaphragms at the moment of their swelling, these edges are thinned towards the center of the positive compartments, at 13, as shown by Figure 4 which is a view in horizontal section passing through the center of the element.

The zincs 2 may be of the same width as the frames 11 to form a more homogeneous periphery and avoid a breakage of continuity which would threaten to cut the diaphragms on their edge. This method of operation does not appreciably increase the weight of the accumulator but it would also be quite possible to thin the edges of the zincs while diminishing their width.

In order to limit the block of electrodes to the inner dimensions of the container and to allow a certain inflation increasing towards the center, the group of electrodes could be held by a general framing in the form of a belt or band with projecting edges towards the interior (of U-section) surrounding the whole assembly.

This belt or band represented by element 14 in Figure 5 is made of a thin plate of brass and, extended at 15, can serve as a connection between the negative terminal 16 and the base of the zincs, in the same way as in the preceding Figures 1 and 2. It avoids in the receptacle a permanent strain directed towards the exterior which might in time lead to a breakage. It may also be realized by metallic bands assembled together by rods passing through the protecting frames.

Finally, Figure 6 shows by way of example an embodiment of a positive outlet common to a plurality of wires. Each wire 5 is sealed in the cover by fusion and connected to the terminal 12 by mechanical clamping. This terminal is embedded in the cover 9 without penetrating it, which ensures a tight joint thereof.

The clamping can take place by nut, by conical pin or by any other suitable expedient.

The negative terminal can also be connected in similar manner to identical passage wires.

As regards the substance of the receptacle 4 and of the cover 9, this will preferably be constituted by a styrene or vinyl resin which permit of making air-tight passages by fusion at low temperature.

The embodiments shown in the figures and given by way of example are in no way restrictive. Their object is simply to show various possibilities of embodying the accumulator according to the invention, the essential character of which is the insolubility of the zinc electrode.

What I claim is:

1. An electric storage battery comprising a container, an alkaline electrolyte in said container, said electrolyte being substantially saturated with zinc, a negative electrode in said electrolyte containing zinc, a positive electrode in said electrolyte containing a metal more electropositive than zinc, an electrolyte-permeable separator of regenerated cellulose between said electrodes, and means including said container maintaining said separator under compression, thereby regulating the size of the pores thereof and enabling repeated recharging of the battery.

2. An electric storage battery comprising a container, an alkaline electrolyte in said container, said electrolyte being substantially saturated with zinc, a negative electrode in said electrolyte containing zinc, a positive electrode in said electrolyte containing silver, an electrolyte-permeable separator of regenerated cellulose between said electrodes, and means including said container maintaining said separator under compression, thereby regulating the size of the pores thereof and enabling repeated recharging of the battery.

3. An electric storage battery comprising a container, an alkaline electrolyte in said container, said electrolyte being substantially saturated with zinc, a negative electrode in said electrolyte consisting substantially of zinc and zinc compounds, a positive electrode in said electrolyte consisting substantially of a metal more electropositive than zinc and of compounds of said metal, an electrolyte-permeable separator of regenerated cellulose between said electrodes, and means including said container maintaining said separator under compression, thereby regulating the size of the pores thereof and enabling repeated recharging of the battery.

4. An electric storage battery comprising a container, an alkaline electrolyte in said container, said electrolyte being substantially saturated with zinc, a negative electrode in said electrolyte consisting substantially of zinc and zinc compounds, a positive electrode in said electrolyte consisting substantially of silver and its oxidation products, an electrolyte-permeable separator of regenerated cellulose between said electrodes, and means including said container maintaining said separator under compression, thereby regulating the size of the pores thereof and enabling repeated recharging of the battery.

5. An electric storage battery comprising a container, an alkaline electrolyte in said container, a negative electrode in said electrolyte containing zinc, a positive electrode in said electrolyte containing a metal more electropositive than zinc, said electrolyte being substantially saturated with zinc with a maximum saturation adjacent said negative electrode, a semi-permeable separator of substantially homogeneous organic sheet material between said electrodes, said sheet material being appreciably swellable in said electrolyte, and means including said container maintaining said separator under compression by limiting the swelling of said sheet material in said electrolyte, thereby regulating the size of the pores thereof and enabling repeated recharging of said battery.

HENRI ANDRÉ.

REFERENCES CITED

The following references are of record in the file of this patent:

UNITED STATES PATENTS

| Number | Name | Date |
| --- | --- | --- |
| Re. 13,174 | Morrison | Nov. 22, 1910 |
| 714,201 | Lasczynski | Nov. 25, 1902 |
| 1,586,406 | Caillard | May 25, 1926 |
| 1,611,910 | Hazelett | Dec. 28, 1926 |
| 1,966,644 | Pollock | July 17, 1934 |
| 2,307,299 | Powning | Jan. 5, 1943 |
| 2,317,711 | André | Apr. 27, 1943 |
| 2,422,045 | Ruben | June 10, 1947 |

FOREIGN PATENTS

| Number | Country | Date |
| --- | --- | --- |
| 605,262 | France | May 22, 1926 |
| 428,074 | Great Britain | May 8, 1935 |